(12) United States Patent
Zeng et al.

(10) Patent No.: US 8,853,900 B2
(45) Date of Patent: Oct. 7, 2014

(54) COMBINATION OF OUTER MOTOR AND CONTROL BOX THEREFOR

(75) Inventors: Chongsheng Zeng, Zhongshan (CN); Mingpan Pan, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 399 days.

(21) Appl. No.: 13/283,546

(22) Filed: Oct. 27, 2011

(65) Prior Publication Data

US 2012/0104907 A1    May 3, 2012

(30) Foreign Application Priority Data

Nov. 2, 2010 (CN) ...................... 2010 2 0600663 U (51) Int. Cl.
*H02K 5/00* (2006.01)
*H02K 11/00* (2006.01)

(52) U.S. Cl.
CPC ................................. *H02K 11/0073* (2013.01)
USPC .......................................... 310/68 R; 310/71

(58) Field of Classification Search
USPC .......................................... 310/71, 68 B, 89
See application file for complete search history.

(56) References Cited

U.S. PATENT DOCUMENTS

| | | | | |
|---|---|---|---|---|
| 3,860,139 A | * | 1/1975 | French et al. | 220/3.5 |
| 6,274,957 B1 | * | 8/2001 | Mahn et al. | 310/89 |
| 6,731,036 B2 | * | 5/2004 | Ghiotto | 310/89 |
| 6,831,382 B1 | * | 12/2004 | Lyle et al. | 310/89 |
| 2002/0047349 A1 | * | 4/2002 | Lee | 310/68 B |
| 2002/0172035 A1 | * | 11/2002 | Hara et al. | 362/119 |
| 2004/0145259 A1 | * | 7/2004 | Wysk et al. | 310/89 |

* cited by examiner

*Primary Examiner* — Quyen Leung
*Assistant Examiner* — Naishadh Desai
(74) *Attorney, Agent, or Firm* — Matthias Scholl P.C.; Matthias Scholl (57) ABSTRACT

A combination of an outer motor and a control box therefor including an upper main body and a lower controller. The upper main body includes a casing, a front end cover, a rotor assembly, and a stator assembly. The controller includes a control box and a control circuit board, and the control box is sheathed in a tail end of the casing. A center of an upper bottom surface of the control box is arranged with a bearing chamber corresponding to that arranged at the front end cover. The control box forms a cavity downwards accommodating the control circuit board. A cover is mounted at the bottom of the control box. A fairlead arranged at an inner wall of the control box extends through the bottom of the motor casing to connect an empty cavity of the casing.

13 Claims, 7 Drawing Sheets

COMBINATION OF OUTER MOTOR AND CONTROL BOX THEREFOR

CROSS-REFERENCE TO RELATED APPLICATIONS

Pursuant to 35 U.S.C. §119 and the Paris Convention Treaty, this application claims the benefit of Chinese Patent Application No. 201020600663.4 filed Nov. 02, 2010, the contents of which are incorporated herein by reference.

BACKGROUND OF THE INVENTION

1. Field of the Invention

The invention relates to a combination of an outer motor and a control box therefor.

2. Description of the Related Art

A conventional brushless DC motor is composed of a main body and a controller having a control box, in which the main body includes a front end cover, a rotor, a stator, a casing, and a rear end cover while the controller itself is an aluminum casting piece directly mounted at the rear end cover of the main body. The control box includes a circuit board, on which electronic components are mounted. An empty cavity inside the motor casing is separated from a cavity of the control box. Thus, the structure has the following disadvantages: 1) the controller is independent from the rear end cover, thus it is complicated and costly to make; 2) the main body and the controller are respectively connected with lead wires and thus the electrical connection is complex and liable to cause fault; and 3) the control box has no capacity of water discharge, and thus it is easy to be soaked by water, thereby leading to a high failure rate.

SUMMARY OF THE INVENTION

In view of the above-described problems, it is one objective of the invention to provide a combination of an outer motor and a control box therefor in which a control box is employed as a rear end cover of a main body, a fairlead arranged on the edge of an inner wall of the control box extends through the bottom of a motor casing to connect the empty cavity. Such combination has the following advantages: it is better integrated with a reasonable and orderly wiring installation; the motor lead wire can be easily connected; the control circuit board is enclosed in the control box and located at an upper side of the control box, thus it is unlikely to be soaked by water and the motor has more stable performance and long service life.

To achieve the above objective, in accordance with one embodiment of the invention, there provided is combination of an outer motor and a control box therefor comprising an upper main body and a lower controller, wherein the upper main body comprises a casing, a front end cover, a rotor assembly, and a stator assembly; the rotor assembly and the stator assembly are mounted inside the casing and the front end cover is arranged at the upper end of the casing; the controller comprises a control box and a control circuit board, and the control box is sheathed in a tail end of the casing; a center of an upper bottom surface of the control box is arranged with a bearing chamber corresponding to that arranged at the front end cover and providing support for the rotor assembly via a bearing; the control box forms a cavity downwards accommodating the control circuit board; a cover is mounted at the bottom of the control box; a fairlead arranged at an inner wall of the control box extends through the bottom of the motor casing to connect an empty cavity of the casing; a connecting wire connecting the main body and the controller extends through the fairlead and motor lead wires extend out of the control box.

In a class of this embodiment, the upper bottom surface separates the empty cavity inside the casing from the cavity of the control box.

In a class of this embodiment, the fairlead is in pairs with one for a power line and the other one for a signal line.

In a class of this embodiment, the fairlead has a length smaller than a height of the side wall of the control box and the fairlead is spaced apart from the cover.

In a class of this embodiment, an edge of the upper bottom surface of the control box is arranged with a screw hole base, by means of which bolts are used to connect the front end cover and the control box together.

In a class of this embodiment, the control box is an aluminum casting piece.

In a class of this embodiment, the inner wall of the control box is arranged with a column having screw holes, by means of which bolts are used to connect the cover and the control box together.

Advantages of the invention are summarized below: 1) the control box is sheathed in the tail end of the casing, the upper bottom surface center of the control box is arranged with the bearing chamber corresponding to that arranged at the front end cover and providing support for the rotor assembly via the bearing, the control box forms the cavity downwards accommodating the control circuit board, the cover is mounted at the bottom of the control box, the fairlead arranged at inner wall of the control box extends through the bottom surface of the motor casing to connect the empty cavity, the connecting wire connecting the motor and the controller extends through the fairlead and all motor lead wires extend out of the control box. Such structure has a reasonable and orderly wiring installation with simple and cost-effective production process, thus the motor will be more competitive; 2) the fairlead is in pairs with one for a power line and the other one for a signal line, the fairlead has a length smaller than a height of the side wall of the control box and it is spaced apart from the cover. The water entering the inner motor will be firstly guided to the control box through the fairlead and then discharged from the water outlet arranged at the control box. In this way, the control circuit board mounted at upper side of the fairlead is unlikely to be soaked in water, thereby prolonging its service life; and 3) the bottom surface separates the empty cavity inside the motor casing from the cavity of the control box, and thus such structure is more compact and integrated.

DETAILED DESCRIPTION OF THE EMBODIMENTS

For further illustrating the invention, experiments detailing combination of an outer motor and a control box therefor are described below. It should be noted that the following examples are intended to describe and not to limit the invention.

Figure 1:
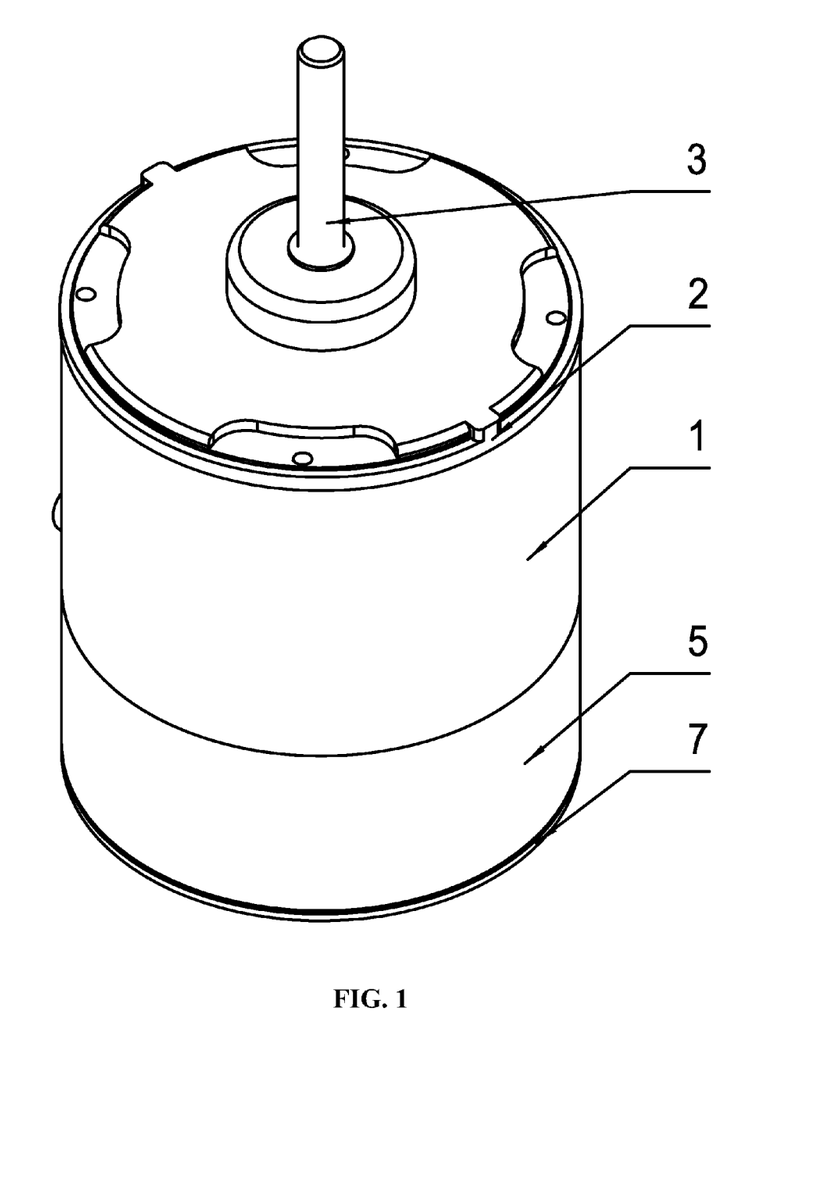
FIG. 1 is a three-dimensional diagram of a combination of an outer motor and a control box therefor according to one embodiment of the invention.
Figure 2:
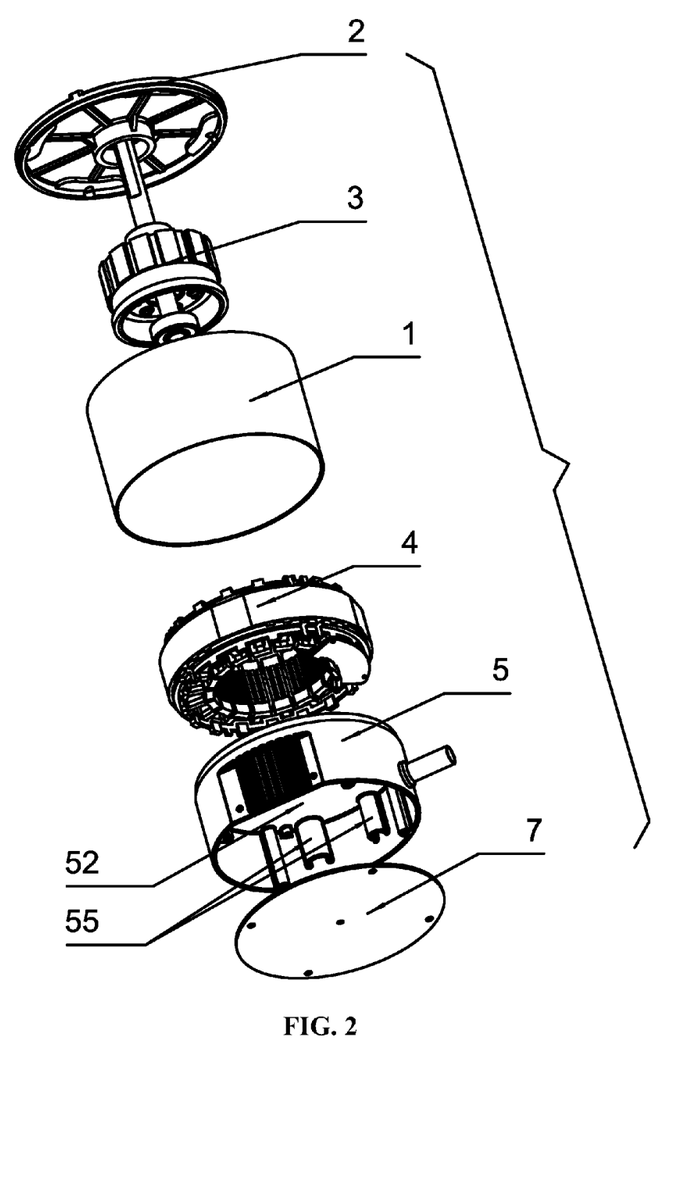
FIG. 2 is an exploded view of a combination of an outer motor and a control box therefor according to one embodiment of the invention.
Figure 3:
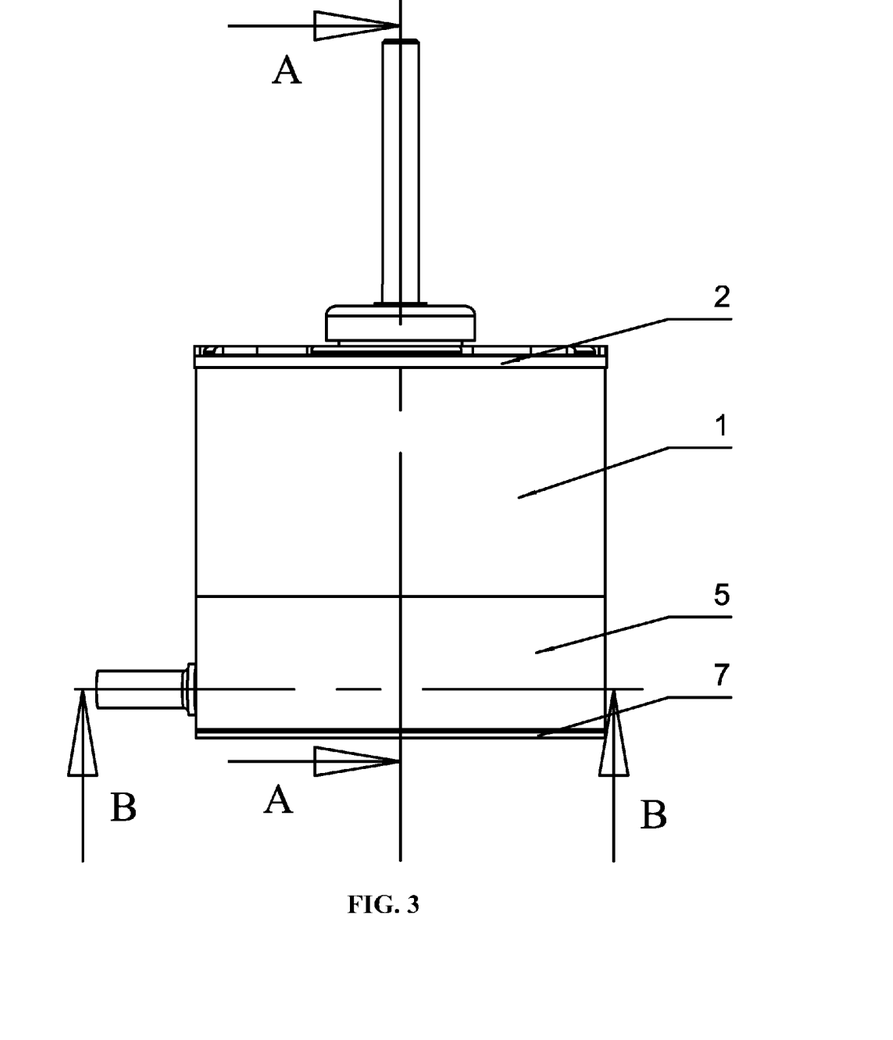
FIG. 3 is a front view of a combination of an outer motor and a control box therefor according to one embodiment of the invention.
Figure 4:
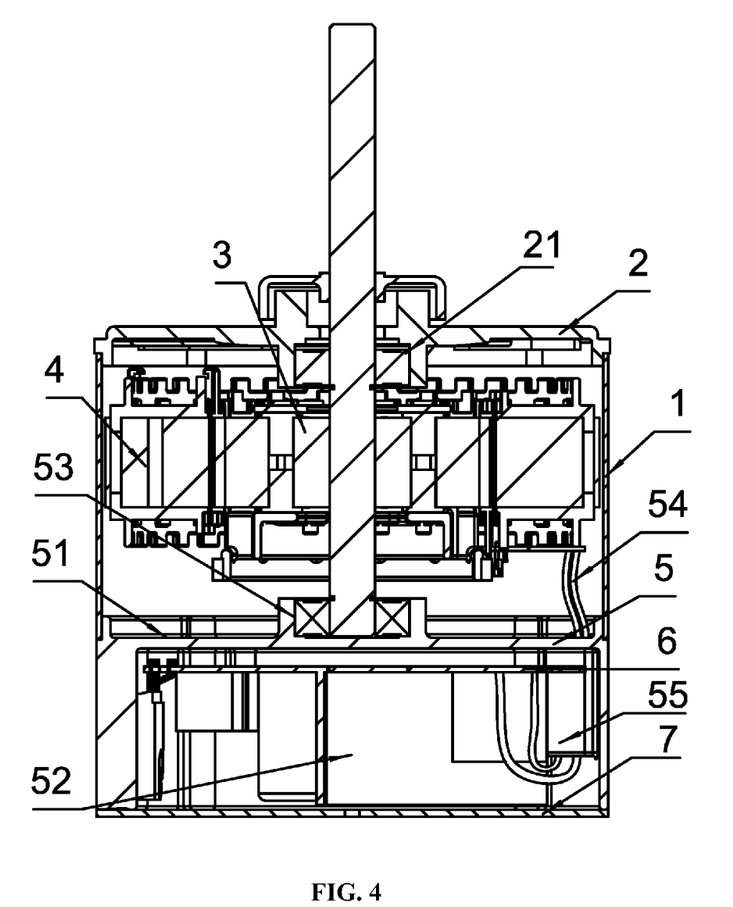
FIG. 4 is a sectional view of A-A portion of FIG. 3.
Figure 5:
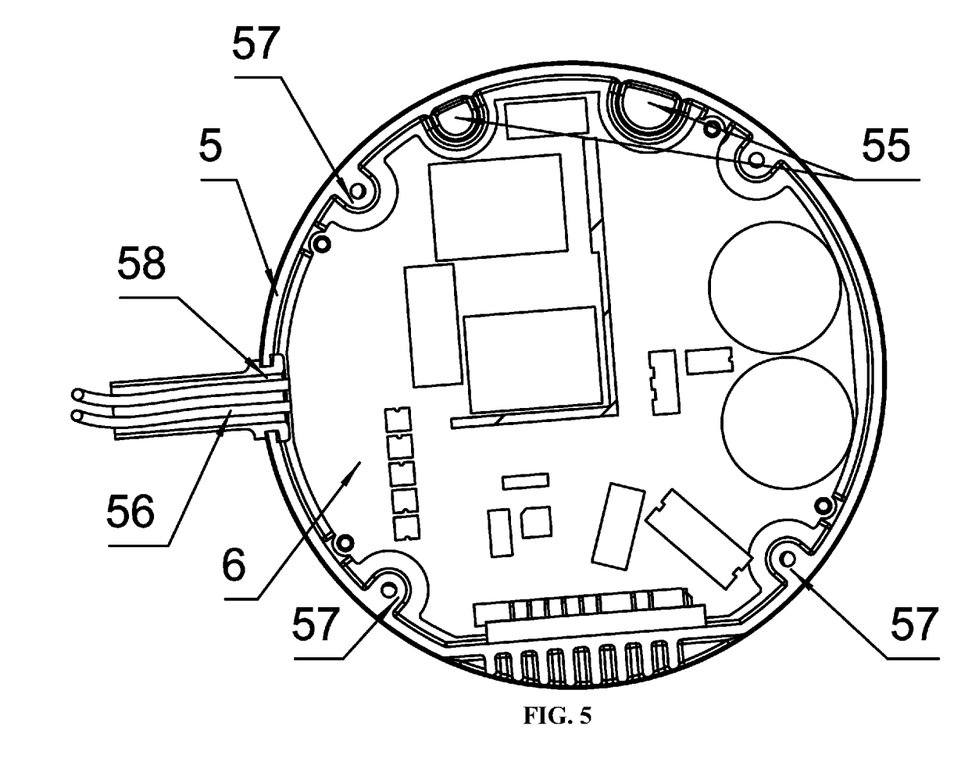
FIG. 5 is a sectional view of B-B portion of FIG. 3.
Figure 6:
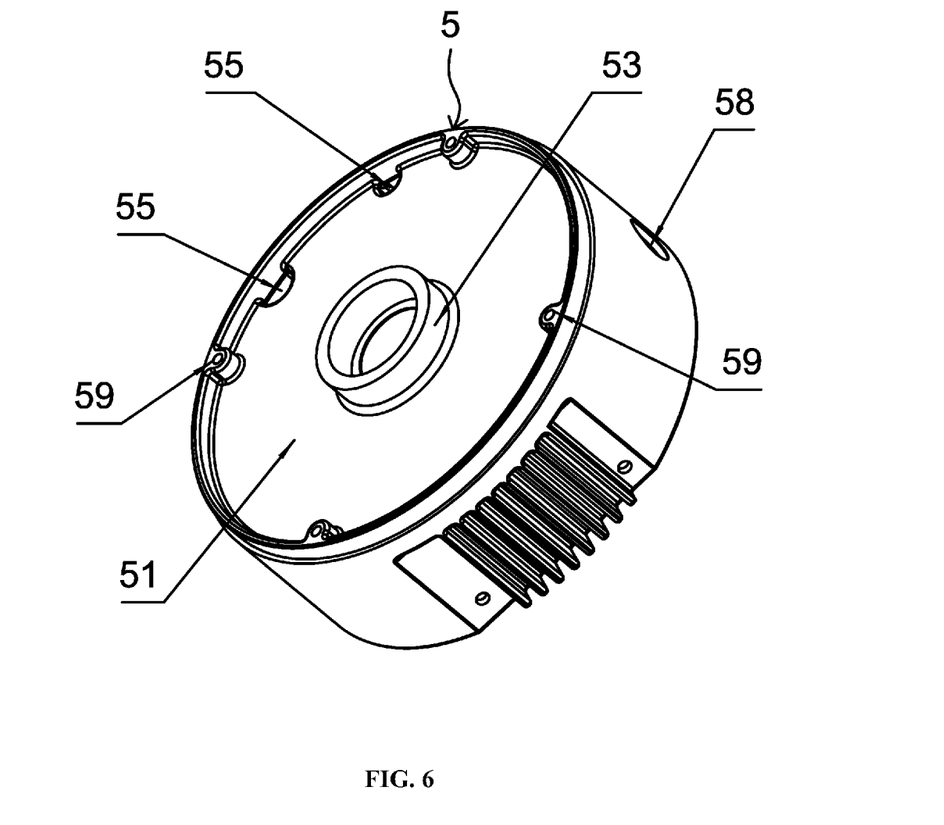
FIG. 6 is a three-dimensional diagram of a control box according to one embodiment of the invention.
Figure 7:
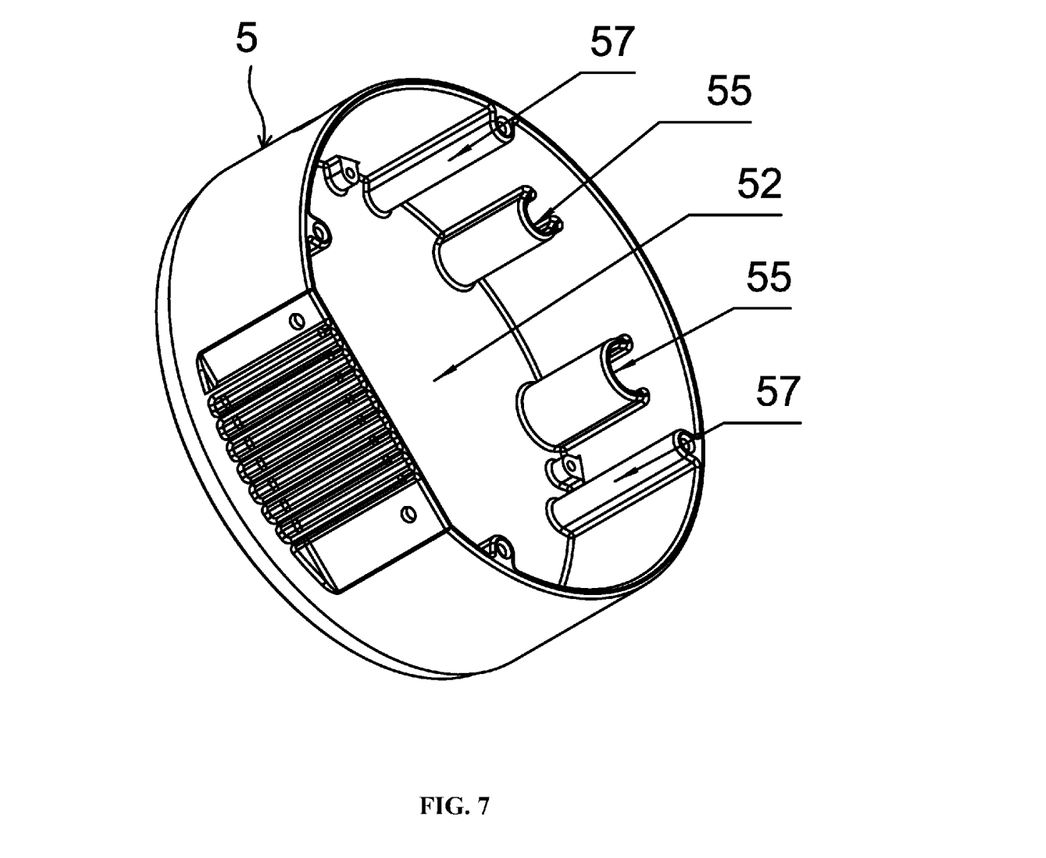
FIG. 7 is another three-dimensional diagram of a control box according to one embodiment of the invention.

As shown in FIGS. 1-7, combination of an outer motor and a control box therefor comprises an upper main body and a lower controller. The upper main body comprises a casing 1, a front end cover 2, a rotor assembly 3, and a stator assembly 4. The rotor assembly 3 and the stator assembly 4 are mounted inside the casing 1 and the front end cover 2 is mounted at the upper end of the casing 1. The controller comprises a control box 5 and a control circuit board 6. The control box 5 is sheathed in a tail end of the casing 1. A center of an upper bottom surface 51 of the control box 5 is arranged with a bearing chamber 53 corresponding to a bearing chamber 21 arranged at the front end cover 2 and providing support for the rotor assembly 3 via a bearing. The control box 5 forms a cavity 52 downwards accommodating the control circuit board 6, and a cover 7 is mounted at the bottom of the control box 5. A fairlead 55 arranged at inner wall of the control box 5 extends through the upper bottom surface 51 of the casing 1 to connect the empty cavity, a connecting wire 54 connecting the motor and the controller extends through the fairlead 55 and all motor lead wires 56 extend out of a wire outlet 58 of the control box 5. The upper bottom surface 51 separates the empty cavity inside the casing 1 from the cavity 52 of the control box 5. The fairlead 55 is in pairs with one for a power line and the other one for a signal line. The fairlead 55 has a length smaller than a height of the side wall of the control box 5 and the fairlead 55 is spaced apart from the cover 7. An edge of the upper bottom surface 51 of the control box 5 is arranged with a screw hole base 59, by means of which bolts are used to connect the front end cover 2 and the control box 5 together. The control box 5 is an aluminum casting piece. The inner wall of the control box 5 is arranged with a column 57 having screw holes, by means of which bolts are used to connect the cover 7 and the control box 5 together.

The working principle of the invention is as follows: the controller coupled with the rear end cover comprises the control box 5 and the control circuit board 6. The control box 5 is sheathed in the tail end of the casing 1. The center of the upper bottom surface 51 of the control box 5 is arranged with the bearing chamber 53 corresponding to the bearing chamber 21 arranged at the front end cover 2 and providing support for the rotor assembly 3 via the bearing. The control box 5 forms the cavity 52 downwards accommodating the control circuit board 6. The cover 7 is mounted at the bottom of the control box 5. The fairlead 55 arranged at inner wall of the control box 5 extends through the bottom surface 51 of the motor casing 1 to connect the empty cavity. The connecting wire extends through the fairlead 55 to connect the control circuit board 6 electrically and all motor lead wires extend out of the control box 5. The fairlead 55 is in pairs with one for a power line and the other one for a signal line. The fairlead 55 has a length smaller than the height of the side wall of the control box 5 and the fairlead 55 is spaced apart from the cover 7. The water entering the inner motor will be firstly guided to the control box through the fairlead and then discharged from the water outlet arranged at the control box. It has the advantages that the control circuit board mounted at upper side of the fairlead is unlikely to be soaked in water, and thereby the control circuit board is protected and the service life thereof is prolonged.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A combination of an outer motor and a control box therefor, comprising:
   a) an upper main body comprising a casing, a front end cover, a rotor assembly, and a stator assembly; and said casing having a first cavity; and
   b) a lower controller comprising a control box and a control circuit board; and said control box having a top surface, a bottom, and a second cavity;
   wherein:
   said rotor assembly and said stator assembly are mounted inside said casing and said front end cover is arranged at an upper end of said casing;
   said control box is connected to an end of said casing;
   a center of said top surface is arranged with a first bearing chamber corresponding to a second bearing chamber arranged at said front end cover and providing support for said rotor assembly via a bearing;
   said top surface separates said first cavity from said second cavity;
   said control circuit board is accommodated in said second cavity;
   a cover is mounted at the bottom of said control box;
   a fairlead is arranged at an inner side wall of said control box, an end of said fairlead is connected to and extends through said top surface; and said fairlead is hollow and connects said first cavity to said second cavity; and
   a connecting wire connecting said upper main body to said lower controller extends through said fairlead and motor lead wires extend out of said control box.

2. The combination of claim 1, wherein said fairlead is in pairs with one for a power line and the other one for a signal line.

3. The combination of claim 2, wherein said fairlead has a length smaller than a height of a side wall of said control box and said fairlead is spaced apart from said cover.

4. The combination of claim 3, wherein an edge of said top surface is arranged with a screw hole base, by means of which bolts are used to connect said front end cover and said control box together.

5. The combination of claim 1, wherein said control box is an aluminum casting piece.

6. The combination of claim 1, wherein said inner side wall of said control box is further arranged with a column having screw holes, by means of which bolts are used to connect said cover and said control box together.

7. The combination of claim 1, wherein said fairlead is disposed along a direction parallel to an axial direction of said control box.

8. A combination of an outer motor and a control box therefor, comprising:
   a) a main body comprising a first cover, a rotor assembly, a stator assembly, and a casing having a first cavity; and
   b) a controller comprising a control circuit board, a second cover, a fairlead having an end, and a control box having a top surface, a bottom, an inner side wall, and a second cavity;
   wherein:
   said first cover is arranged at an upper end of said casing;

said rotor assembly and said stator assembly are mounted inside said casing;
a center of said top surface is arranged with a first bearing chamber corresponding to a second bearing chamber arranged at said first cover and providing support for said rotor assembly via a bearing;
said control box is disposed outside said casing and is connected to an end of said casing;
said top surface separates said first cavity from said second cavity;
said control circuit board is accommodated in said second cavity;
said fairlead is in a hollow tubular shape and is attached to said inner side wall of said control box along an axial direction of said control box, the end of said fairlead is connected to and extends through said top surface, and said fairlead connects said first cavity to said second cavity;
a connecting wire connecting said main body to said controller extends through said fairlead and motor lead wires extend out of said control box; and
said second cover is mounted at the bottom of said control box.

9. The combination of claim 8, wherein said fairlead is arranged with a power line, and said combination further comprises an additional fairlead arranged with a signal line.

10. The combination of claim 8, wherein said fairlead has a length smaller than a height of a side wall of said control box and said fairlead is spaced apart from said second cover.

11. The combination of claim 8, wherein an edge of said top surface is arranged with a screw hole base, by means of which bolts are used to connect said first cover to said control box.

12. The combination of claim 8, wherein said control box is an aluminum casting piece.

13. The combination of claim 8, wherein said inner side wall of said control box is further arranged with a column having screw holes, by means of which bolts are used to connect said second cover to said control box.

\* \* \* \* \*